US007096577B2

(12) United States Patent
McCullough

(10) Patent No.: US 7,096,577 B2
(45) Date of Patent: Aug. 29, 2006

(54) EXPLOSIVELY ACTUATED TOOLS

(75) Inventor: David John McCullough, Hawthorn East (AU)

(73) Assignee: Cetram PTY Limited, Victoria (AU)

(*) Notice: Subject to any disclaimer, the term of this patent is extended or adjusted under 35 U.S.C. 154(b) by 344 days.

(21) Appl. No.: 10/667,606

(22) Filed: Sep. 23, 2003

(65) Prior Publication Data

US 2004/0104257 A1 Jun. 3, 2004

(30) Foreign Application Priority Data

Sep. 25, 2002 (AU) ............................. 2002951658

(51) Int. Cl.
*B23P 21/00* (2006.01)

(52) U.S. Cl. .......................... 29/798; 29/896.9; 227/8; 227/9; 267/177; 267/277; 267/278

(58) Field of Classification Search ........ 267/154–157, 267/177, 277, 278; 29/896.9, 798; 227/8–11
See application file for complete search history.

(56) References Cited

U.S. PATENT DOCUMENTS

| | | | | |
|---|---|---|---|---|
| 2,679,645 | A * | 6/1954 | Bullwinkle et al. | 227/11 |
| 2,719,300 | A | 10/1955 | Walker | |
| 2,807,458 | A * | 9/1957 | Stephenson | 267/157 |
| 3,122,060 | A * | 2/1964 | Reed | 89/155 |
| 3,138,888 | A * | 6/1964 | Brewer | 42/70.06 |
| 4,043,001 | A * | 8/1977 | Parsons | 16/222 |
| 4,565,312 | A * | 1/1986 | Berry | 227/8 |
| 4,804,127 | A * | 2/1989 | Kirkman | 227/10 |
| 5,135,151 | A * | 8/1992 | Logan | 227/9 |
| 5,984,940 | A * | 11/1999 | Davis et al. | 606/181 |
| 6,156,050 | A * | 12/2000 | Davis et al. | 606/181 |
| 6,634,349 | B1 * | 10/2003 | Mizek et al. | 124/44.5 |
| 6,676,118 | B1 * | 1/2004 | Chou | 267/177 |
| 2003/0024516 | A1 * | 2/2003 | Mizek et al. | 124/44.5 |
| 2003/0030204 | A1 * | 2/2003 | Chou | 267/177 |

FOREIGN PATENT DOCUMENTS

| | | |
|---|---|---|
| CH | 314 414 | 6/1956 |
| WO | WO 98/08628 | 8/1990 |
| WO | WO 00/35638 | 6/2000 |

* cited by examiner

*Primary Examiner*—David P. Bryant
*Assistant Examiner*—Christopher M. Koehler
(74) *Attorney, Agent, or Firm*—Lowe Hauptman & Berner, LLP

(57) ABSTRACT

A firing mechanism of an explosively actuated tool for driving a fastener into a substrate includes a cocking rod and sear for entraining the firing pin with the firing pin being releasable on cocking by rotation of the sear. The cocking rod and sear form a structure subject to an axial and rotational bias by a coil spring anchored at one end to the structure and at the opposite end to a mounting which during assembly of the mechanism is rotated to apply torsional loading to the spring and is then locked into a housing of the mechanism in an angular orientation in which torsional loading is maintained in the spring.

10 Claims, 4 Drawing Sheets

EXPLOSIVELY ACTUATED TOOLS

BACKGROUND OF THE INVENTION

1) Field of the Invention

The present invention relates to explosively actuated tools for driving a fastener such as a pin into a substrate such as concrete or steel.

2) Description of the Prior Art

Explosively actuated tools for driving a fastener such as a pin into a substrate such as concrete or steel conventionally comprise a driving piston which is driven forwardly along the barrel of the tool upon detonation of an explosive charge to drive into the substrate a fastener within the forward end of the barrel. Tools of this type conventionally comprise a safety mechanism whereby to fire the tool, the firing mechanism must be cocked by pushing the forward end of the barrel against the substrate. This causes the barrel to retract through a limited distance into the housing of the tool and this movement, in turn, cocks the tool and enables firing of the tool. This safety mechanism is designed to ensure that the tool can only be fired in its operative position pressed against the substrate and various forms of cocking mechanism responsive to the retraction of the barrel within the tool are well known per se to those skilled in this art.

In International patent application PCT/AU90/00018 (WO 90/08628) there is disclosed a tool of the type just described in which the firing pin is held in its cocked position by a rotary sear which is displaced rearwardly during cocking by pressing the forward end of the barrel against the substrate. The sear entrains the firing pin during the cocking action against the bias of the firing pin spring. The sear itself is mounted on a cocking rod which, on cocking, is displaced rearwardly against the bias of a separate compression coil spring. This coil spring not only applies a forwards axial bias to the cocking rod and sear carried thereby, but also a rotational or torsional bias in a sense to pivot the sear into engagement with the firing pin. In existing tools of this type currently in production, the cocking rod and firing pin are mounted in a housing of block-like form. The coil spring which axially and rotationally biases the cocking rod extends rearwardly from the cocking rod to be received in a blind bore at the rear end of the housing. During assembly, insertion of the rear end of the spring into the bore induces a twist in the spring to provide the torsional bias. The twist which can be achieved in this way is typically not more than about 90°. As a consequence, the coil spring must itself be sufficiently strong to provide the required torsional bias just with a twist of approximately 90°.

After the tool has been fired, the driving piston is within the forward end of the barrel and appropriate action must be taken to reset the piston into a rear position within the barrel in preparation for the next driving stoke. In many existing tools, resetting is accomplished by a manual action involving the operator drawing the barrel forwardly from the housing of the tool while the piston is restrained so that the piston then lies within a rear part of the barrel which is then retracted manually back into the housing. However, tools with semi-automatic or fully automatic resetting systems are now widely produced. One form of semi-automatic resetting system involves resetting of the piston when cocking the tool and an example of this is described in International patent application PCT/AU99/01097 (WO 00/35638). This type of resetting system necessarily requires the application of a greater force needed to cock the tool as one or more additional springs are incorporated as part of the resetting mechanism and are loaded during cocking. Thus, cocking must take place against the combined forces of the spring(s) of the resetting mechanism, the firing pin spring, and the cocking rod/sear spring.

SUMMARY OF THE INVENTION

We have determined that the required cocking force in such a tool may sometimes be unacceptably high and that, accordingly, it is beneficial for this to be reduced. We have also determined that an appropriate reduction in overall spring force can be obtained without compromising the operation of the tool by using a weaker cocking rod spring but subjecting this to greater twisting in order to provide the required torque.

According to the present invention there is provided an explosively actuated tool for driving a fastener into a substrate, said tool having a barrel, a piston displaceable in the barrel on firing of the tool to drive a fastener from the forward end of the barrel into the substrate upon firing of a charge, and a firing mechanism including a firing pin, and a rotary sear pivotal between a position in which the sear entrains the firing pin and a position in which the sear is released whereby the firing pin is driven towards the charge to thereby fire the charge, wherein the rotary sear is carried by a cocking rod, and the cocking rod and the sear carried thereby is subject to a rotational and axial bias by a spring anchored at one end relative to the cocking rod and at the other end to a mounting, the mounting being rotatable to apply torsional loading to the spring and being lockable to a housing of the cocking rod in an angular orientation in which torsional loading is maintained in the spring.

In the preferred embodiment of the invention, the spring is a compression coil spring and the mounting is in the form of a hollow cap within which a rear end portion of the spring is engaged. The cap is formed for co-operation with a hand tool to facilitate its rotation in order to apply the required torsional loading to the spring; for example the cap may be formed with a screw driver slot or a hexagonal formation for cooperation with a socket.

Preferably the cap is of cylindrical form and is locatable into a cylindrical passage formed in the housing, the cap being releasably locked within the passage in the required angular orientation to provide the required torsional loading, such as by a bayonet type fixing. To compensate for manufacturing tolerances in the spring, the cap may be locked within the passage in a selected one of two or more different angular orientations to provide the required torque characteristics notwithstanding slight differences in spring characteristics between different springs. Although the bayonet type fixing is particularly convenient and is preferred, it is to be understood that other types of fixing capable of providing one or more predetermined angular locking positions can be used, for example fixings which provide a snap-in action provided by resilient lugs.

Preferably the cocking rod extends rearwardly beyond the sear and the forward end part of the spring is fitted over this extension. The extension is of a length so as to provide adequate axial support for the spring.

Further according to the invention, there is provided an explosively actuated tool for driving a fastener into a substrate, said tool having a barrel, a piston displaceable in the barrel on firing of the tool to drive a fastener from the forward end of the barrel into the substrate upon firing of a charge, and a firing mechanism including a firing pin, and a rotary sear pivotal between a position in which the sear entrains the firing pin and a position in which the sear is released whereby the firing pin is driven towards the charge to thereby fire the charge, wherein the rotary sear is carried by a cocking rod, and the cocking rod and the sear carried thereby is subject to a rotational and axial bias by a spring anchored at one end to the structure formed by the cocking rod and sear and at the other end to a mounting, the mounting being rotated during assembly of the firing mechanism to apply torsional loading to the spring and then being locked to a housing of the cocking rod and firing pin in an angular orientation in which torsional loading is maintained in the spring.

Still further according to the invention, there is provided a firing mechanism of an explosively actuated tool for driving a fastener into a substrate, said mechanism including a cocking rod with a sear for entraining a firing pin with the firing pin being releasable on cocking by rotation of the sear, the cocking rod and sear forming a structure subject to an axial and rotational bias by a coil spring anchored at one end to the structure and at the opposite end to a mounting which during assembly of the mechanism is rotated to apply torsional loading to the spring and is then locked into a housing of the mechanism in an angular orientation in which torsional loading is maintained in the spring.

Still further according to the invention, there is provided a method of assembling an explosively actuated tool for driving a fastener into a substrate, said tool having a barrel, a piston displaceable in the barrel on firing of the tool to drive a fastener from the forward end of the barrel into the substrate upon firing of a charge, and a firing mechanism including a firing pin, and a rotary sear pivotal between a position in which the sear entrains the firing pin and a position in which the sear is released whereby the firing pin is driven towards the charge to thereby fire the charge, the rotary sear being carried by a cocking rod for axial and rotational movement therewith in a housing for the firing pin and cocking rod, wherein said method includes:

- anchoring a forward end of a compression coil spring to the structure formed by the cocking rod and rotary sear carried thereby;
- anchoring a rear end of the spring to a mounting;
- rotating the mounting about the axis of the coil spring to apply a torsional loading to the spring; and
- locking the mounting to the housing in a predetermined angular orientation in which torsional loading is maintained in the spring, the spring thereby providing a forwards axial bias to the cocking rod and sear, and a rotational bias to the cocking rod and sear in a sense to pivot the sear into engagement with the firing pin.

Although the invention is particularly applicable to tools having a driving piston resetting mechanism operated by cocking of the tool, nevertheless it also does have applicability to tools without such a mechanism.

BRIEF DESCRIPTION OF THE DRAWINGS

An embodiment of the invention will now be described by way of example only with reference to accompanying drawings in which.

DESCRIPTION OF THE PREFERRED EMBODIMENTS

An explosively actuated tool in accordance with the preferred embodiment of the present invention incorporates a cocking rod carrying a rotary sear as described in International patent application PCT/AU90/00018 previously discussed (the disclosure of which is hereby incorporated by reference), and a piston resetting mechanism which operates on cocking the tool for example as described in International patent application PCT/AU99/01097 also as previously discussed (the disclosure of which is hereby incorporated by reference). Reference should be made to these International patent applications for a full understanding of the mechanisms concerned. The improvement represented by the present invention relates to the mounting system for the cocking rod spring and only that aspect will be described in detail in conjunction with related aspects of the firing mechanism.

Figure 1:
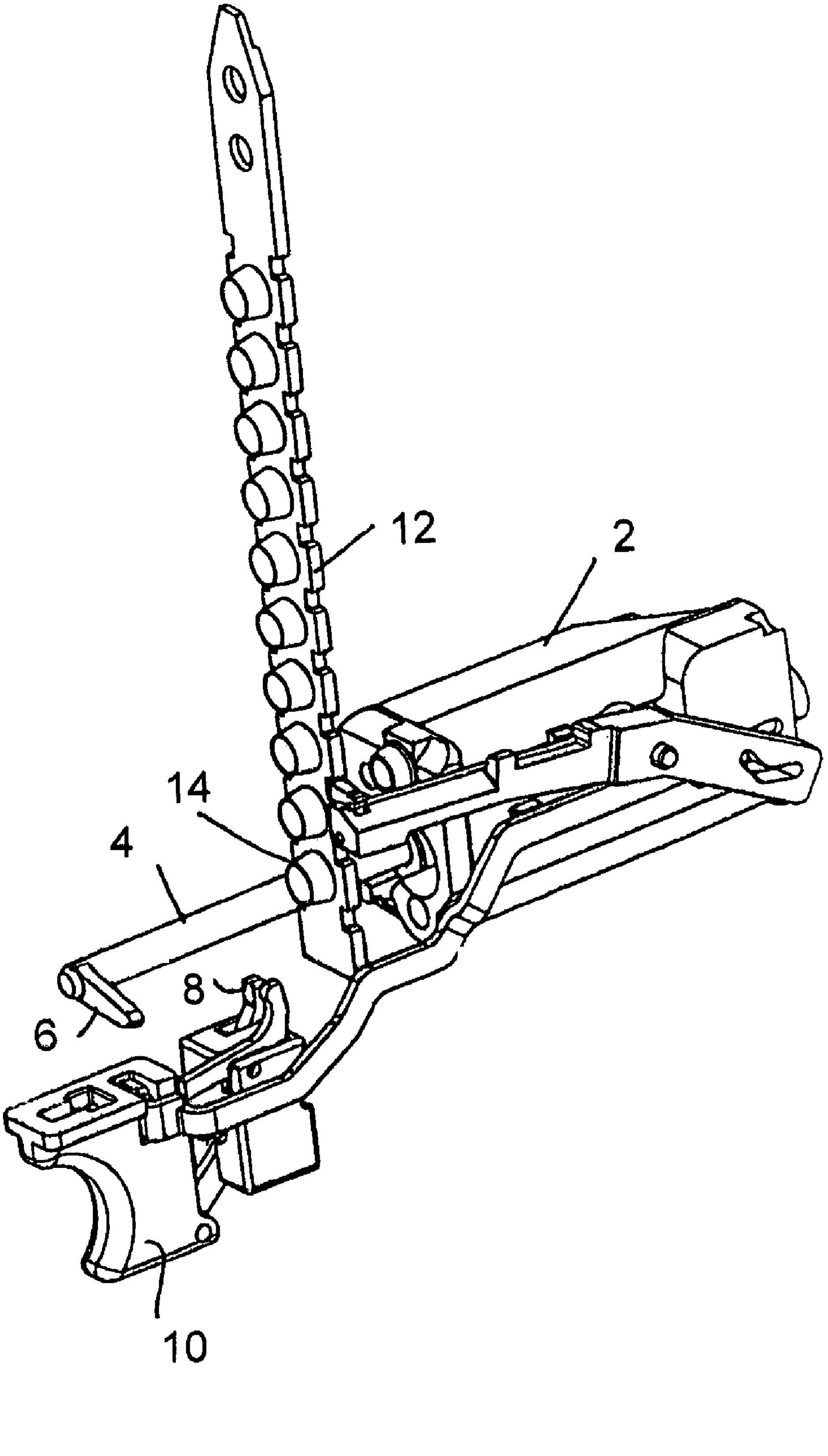
FIG. 1 is a perspective view showing the firing mechanism of a tool in accordance with the present invention.
Figure 2:
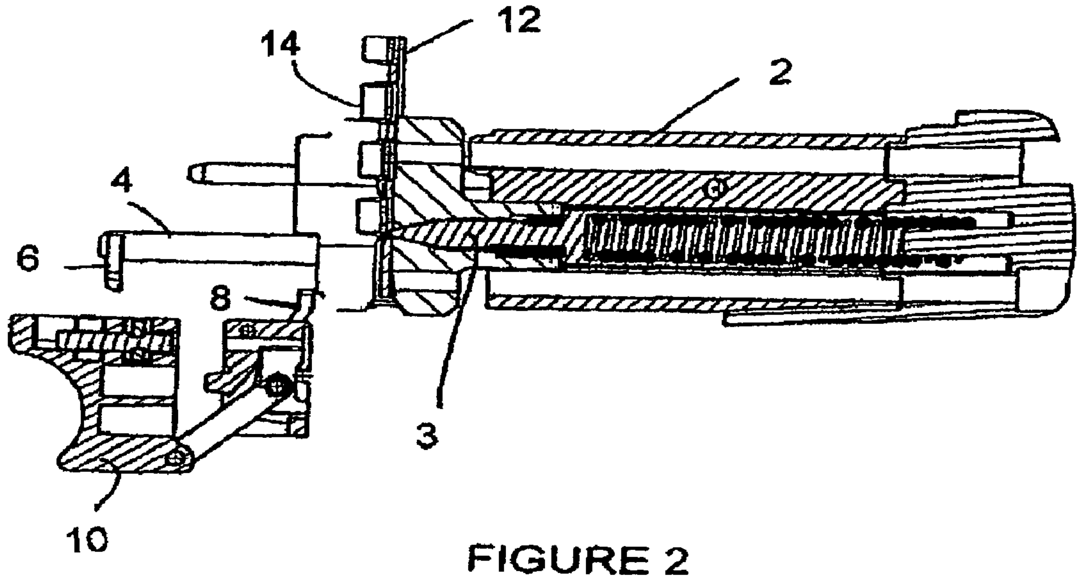
FIG. 2 is a cross section through the mechanism and showing the firing pin.
Figure 3:
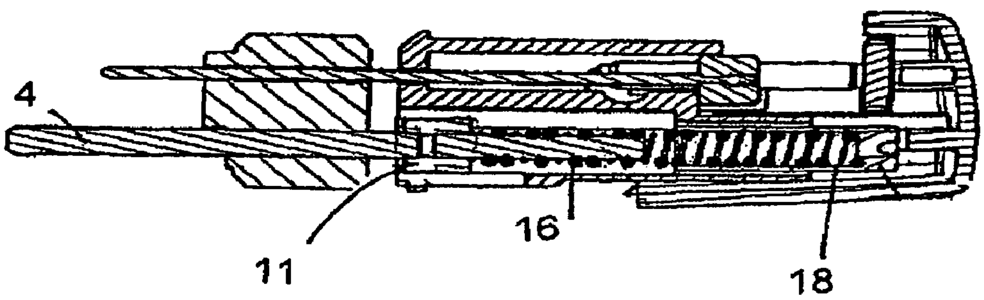
FIG. 3 is a further cross section through the mechanism to show the cocking rod and cocking rod spring.

FIGS. 1 to 3 show the basic firing mechanism of a tool in accordance with the preferred embodiment of the invention. The mechanism comprises a block-like housing 2 in which is mounted the firing pin 3 and a cocking rod 4 projecting forwardly of the housing 2 and having at its forward end a radial arm 6 for cooperation in the cocked condition (in which the cocking rod 4 is retracted into the housing 2 from the position shown in FIG. 1) for cooperation with a trigger link 8. The link is actuated by depression of a trigger 10 to cause rotation of the cocking rod 4 and also of a sear 11 carried by the cocking rod 4 for rotation therewith to thereby release the firing pin 3. FIG. 1 also shows a charge strip 12 carrying a series of explosive charges 14; the firing pin 3, when released by the sear 11, fires the explosive charge located in the operative firing position. FIG. 1 also shows an indexing system for indexing the charge strip 12 to present successive charges 14 at the operative firing position; this indexing mechanism forms no part of the present invention and will not be further described.

The cocking rod spring which is designated 16 applies an axial bias to the cocking rod 4 in a forwards direction and also a rotational bias in order to rotate the sear 11 into engagement with an abutment of the firing pin 3. In the preferred embodiment, the cocking rod spring 16 is made as a relatively weak spring in axial compression as operation of the tool does not require a high axial load to be imparted to the cocking rod 4. However, the spring 16 is required to apply a relatively high torque to the cocking rod 4 to ensure satisfactory and safe operation of the firing mechanism. These characteristics are obtained in the preferred embodiment by the use of a relatively long compression spring which is then subject to a twist of appropriate angular extent in order to obtain the required torque loading.

Figure 4:
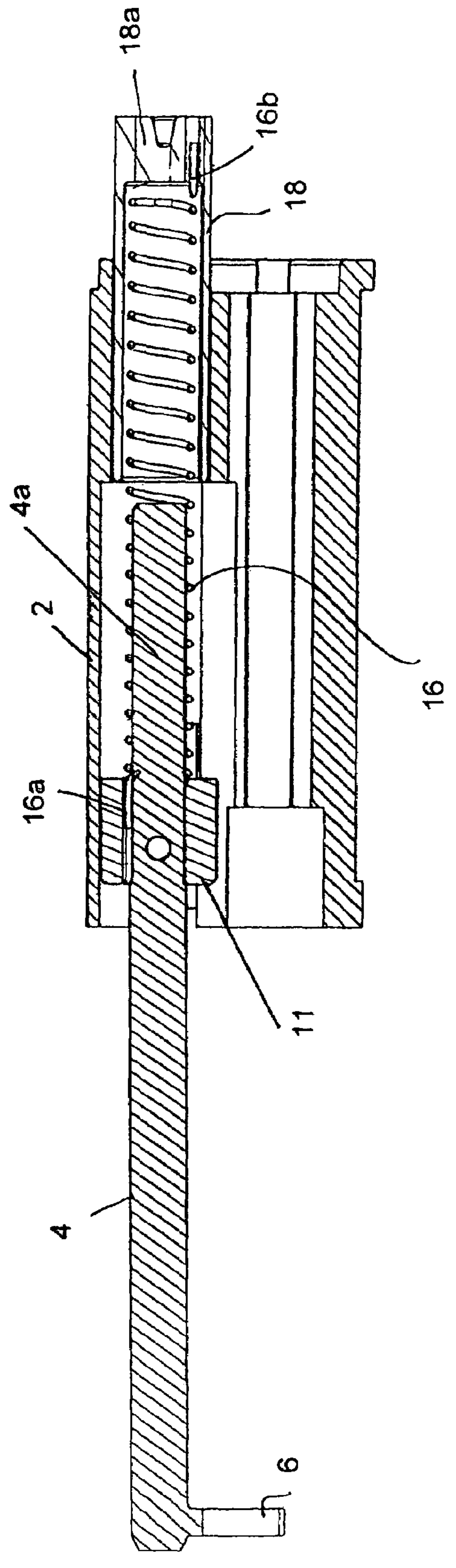
FIG. 4 is a further section to an enlarged scale showing the cocking rod, the cocking rod spring and its mounting cap within a housing of the firing mechanism.
Figure 5:
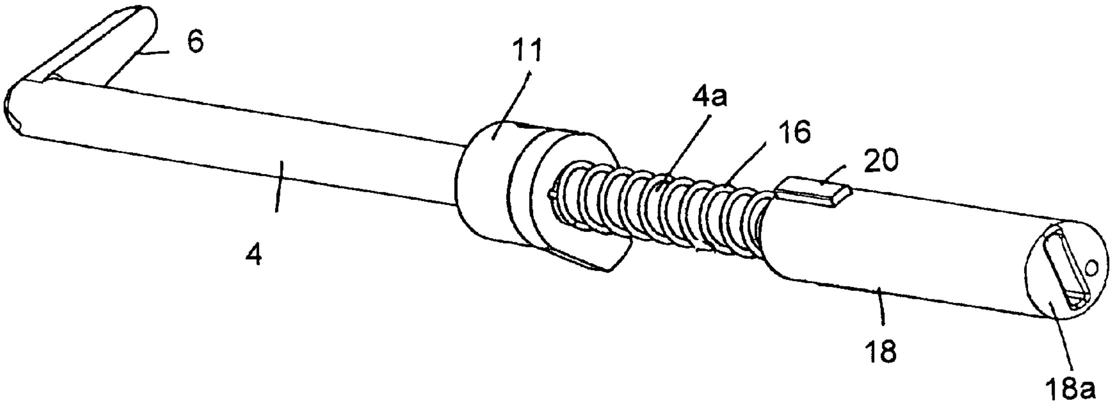
FIG. 5 shows the cocking rod, spring, and mounting cap with the housing omitted for clarity of illustration.

The cocking rod 4 has a substantial rearwards extension **4*a* beyond the sear 11 (see in particular FIGS. 4 and 5) and this extension provides a support for a substantial part of the length of the spring 16 to ensure that the spring 16, despite its length and relatively low force characteristics in axial compression, remains properly axially aligned with the cocking rod 4. At its forward end, the wire 16*a* forming the spring 16 is anchored in an axial aperture in the rotary sear 11. The rearwards part of the spring 16 is located within the bore of a hollow cylindrical cap 18 and is anchored to a rear end wall 18*a* of the cap 18 by engagement of the spring wire 16*b* in an axial aperture in that end wall 18*a*, the cap thereby forming a mounting for the rear end of the spring 16. The cap 18 with the rear part of the spring 16 captive therein is mounted in a cylindrical passage in the housing 2 by a bayonet type fixing comprising opposed lugs 20 on the external surface of the cap 18 engageable within axial grooves on the inner surface of the passage (or visa versa). It will be seen from FIGS. 3 and 4 that the rear end of the cocking rod extension 4***a* lies adjacent to the forward end of the cap 18 so that the spring 16 is supported along almost its entire length by the cocking rod extension 4*a* and the cap 18 against misalignment during cocking. As the extension 4*a* is displaced rearwardly during cocking, it will enter into the bore of the cap 18.

The lugs 20 and grooves are so positioned that when the spring 16 has been connected at its front end to the sear 11 and at its rear end to the cap 18, the cap 18 must be rotated through a predetermined angle before the lugs 20 are aligned with the grooves from the rear and thereby the cap 18 can be pushed into the cylindrical passage from the rear. This rotation twists and thereby torsionally tensions the spring 16 to provide the required torsional bias. The angle through which the spring 16 must be twisted will be dependent on the actual characteristics of the spring but typically it will be at least approximately 180°, for example of the order of 210°. To facilitate the twisting action, the end wall 18*a* of the cap 18 is slotted externally to receive a screwdriver, or alternatively the rear end portion may externally be of hexagonal or other formation for cooperation with a socket. When the cap 18 is fully inserted into the cylindrical passage in the housing, the lugs 20 will enter enlarged end zones of the grooves and the cap 18 will then be anchored by a slight rotation of the cap 18 under the influence of the spring bias.

In practice, due to manufacturing tolerances which are likely to arise in the spring, the cap 18 may be inserted into the cylindrical passage in the housing in a selected one of a series of angularly spaced orientations provided by multiple pairs of grooves in the passage. In this case, the spring 16 is twisted to the required torque as determined for example by a torque screwdriver and when the required torque has been attained the cap 18 is rotated further to align with the next available pair of grooves which would be at a relatively small angular displacement from the position of optimum torque.

Although the cocking rod spring arrangement particularly described has particular applicability to a tool incorporating a piston resetting mechanism operative upon cocking the tool, it also has applicability in tools without that facility and where it is desired to reduce the forces needed to be applied to the tool to cock the tool.

The embodiment has been described by way of example only and modifications are possible within the scope of the invention.

The invention claimed is:

1. An explosively actuated tool for driving a fastener into substrate said tool comprising:

a barrel;

a piston displaceable in the barrel on firing of the tool to drive a fastener from a forward end of the barrel into the substrate upon firing of a charge; and a firing mechanism comprising a firing pin, and a rotary sear pivotal between a first position in which the sear entrains the firing pin and a second position in which the sear is released whereby the firing pin is driven towards the charge to thereby fire the charge;

wherein the rotary sear is carried by a cocking rod, and the cocking rod and the sear carried thereby is subject to a rotational and axial bias by a spring anchored at one end relative to the cocking rod and at the other end to a mounting, the mounting being rotatable to apply torsional loading to the spring and being lockable to a housing of the cocking rod in an angular orientation in which torsional loading is maintained in the spring.

2. A tool according to claim 1, wherein the spring is a compression coil spring and the mounting is in the form of a hollow cap within which a rear end portion of the spring is engaged, the cap being formed for co-operation with a tool to facilitate its rotation in order to apply the required torsional loading to the spring.

3. An explosively actuated tool for driving a fastener into substrate, said tool comprising:

a barrel;

a piston displaceable in the barrel on firing of the tool to drive a fastener from a forward end of the barrel into the substrate upon firing of a charge; and a firing mechanism comprising a firing pin, and a rotary sear pivotal between a first position in which the sear entrains the firing pin and a second position in which the sear is released whereby the firing pin is driven towards the charge to thereby fire the charge;

wherein the rotary sear is carried by a cocking rod, and the cocking rod and the sear carried thereby is subject to a rotational and axial bias by a spring anchored at one end relative to the cocking rod and at the other end to a mounting, the mounting being rotatable to apply torsional loading to the spring and being lockable to a housing of the cocking rod in an angular orientation in which torsional loading is maintained in the spring; and wherein the cap is of cylindrical form and is locatable into a cylindrical passage formed in the housing, the cap being releasably locked within the passage in a predetermined angular orientation to provide the required torsional loading.

4. A tool according to claim 3, wherein the cap is locked within the passage in a selected one of two or more different predetermined angular orientations.

5. A tool according to claim 3, wherein with the spring anchored at a front end relative to the cocking rod and at a rear end to the cap, the cap requires rotation through at least approximately 180° for insertion into the passage in the required angular orientation.

6. A tool according to claim 5, wherein the front end of the spring is anchored relative to the cocking rod by engagement with the rotary sear.

7. A tool according to claim 3, wherein the cocking rod extends rearwardly beyond the sear and the forward end part of the spring is fitted over the extension, the extension providing axial support for a substantial part of the spring.

8. An explosively actuated tool for driving a fastener into a substrate, said tool comprising:

a barrel;

a piston displaceable in the barrel on firing of the tool to drive a fastener from a forward end of the barrel into the substrate upon firing of a charge; and a firing mechanism including a firing pin, and a rotary sear pivotal between a first position in which the sear entrains the firing pin and a second position in which the sear is released whereby the firing pin is driven towards the charge to thereby fire the charge;

wherein the rotary sear is carried by a cocking rod, and the cocking rod and the sear carried thereby is subject to a rotational and axial bias by a spring anchored at one end to the structure formed by the cocking rod and sear and at the other end to a mounting, the mounting being rotated during assembly of the firing mechanism to apply torsional loading to the spring and then being locked to a housing of the cocking rod and firing pin in an angular orientation in which torsional loading is maintained in the spring.

9. An explosively actuated tool for driving a fastener into a substrate, comprising a cocking rod with a sear for entraining a firing pin with the firing pin being releasable by rotation of the sear, the cocking rod and sear forming a structure subject to an axial and rotational bias by a coil spring anchored at one end to the structure and at the opposite end to a mounting which is incrementally rotatable to apply torsional loading to the spring and lockable to a housing of the mechanism in an angular orientation in which torsional loading is maintained in the spring.

10. An explosively actuated tool for driving a fastener into a substrate, comprising:

a cocking rod with a sear for entraining a firing pin with the firing pin being releasable by rotation of the sear, the cocking rod and sear forming a structure subject to an axial and rotational bias by a coil spring anchored at one end to the structure and at the opposite end to a mounting; and means associated with the mounting for enabling incremental rotation of the mounting with respect to a housing to vary a torsional loading to the spring.

* * * * *